(12) United States Patent
Kim et al.

(10) Patent No.: US 9,066,365 B2
(45) Date of Patent: Jun. 23, 2015

(54) RELAY STATION DATA TRANSMISSION METHOD

(75) Inventors: Hak Seong Kim, Anyang-si (KR); Yo An Shin, Seoul (KR); Ki Ho Lee, Seoul (KR); Ki Jun Kim, Anyang-si (KR); San Hae Kim, Seoul (KR)

(73) Assignees: LG ELECTRONICS INC., Seoul (KR); SOONGSIL UNIVERSITY RESEARCH-CONSORTIUM TECHNO-PARK OFFICE OF RESEARCH & UNIVERSITY-INDUSTRY COOPERATION, Seoul (KR)

( * ) Notice: Subject to any disclaimer, the term of this patent is extended or adjusted under 35 U.S.C. 154(b) by 403 days.

(21) Appl. No.: 13/510,280

(22) PCT Filed: Nov. 2, 2010

(86) PCT No.: PCT/KR2010/007655
§ 371 (c)(1),
(2), (4) Date: May 16, 2012

(87) PCT Pub. No.: WO2011/059199
PCT Pub. Date: May 19, 2011

(65) Prior Publication Data
US 2012/0238202 A1    Sep. 20, 2012

Related U.S. Application Data

(60) Provisional application No. 61/261,708, filed on Nov. 16, 2009, provisional application No. 61/314,605, filed on Mar. 17, 2010.

(30) Foreign Application Priority Data

May 3, 2010    (KR) ......................... 10-2010-0041242

(51) Int. Cl.
*H04B 3/36* (2006.01)
*H04W 72/12* (2009.01)
*H04W 84/04* (2009.01)

(52) U.S. Cl.
CPC ...... *H04W 72/1231* (2013.01); *H04W 72/1278* (2013.01); *H04W 84/047* (2013.01)

(58) Field of Classification Search
CPC .................. H04W 72/1231; H04W 72/1278; H04W 84/047
See application file for complete search history.

(56) References Cited

U.S. PATENT DOCUMENTS

2008/0227461 A1* 9/2008 Dayal et al. ................. 455/452.2
2008/0318520 A1* 12/2008 Kwun et al. ..................... 455/7
2009/0147706 A1* 6/2009 Yu et al. ....................... 370/277

FOREIGN PATENT DOCUMENTS

| KR | 10-2008-0105831 | 12/2008 |
| KR | 10-2009-0052642 | 5/2009 |
| KR | 10-2009-0052773 | 5/2009 |
| KR | 10-2009-0117907 | 11/2009 |

\* cited by examiner

*Primary Examiner* — Edward Urban
*Assistant Examiner* — Mohammed Rachedine
(74) *Attorney, Agent, or Firm* — Lee, Hong, Degerman, Kang & Waimey

(57) ABSTRACT

A method of a relay node transmitting data is provided. The method includes receiving scheduling information about a backhaul link and data from a base station; receiving channel information about an access link from relay node user equipment; performing scheduling on the access link based on the scheduling information about the backhaul link and the channel information about the access link; and relaying the data to the relay node user equipment according to a result of the scheduling. The backhaul link means a link between the base station and the relay node, and the access link means a link between the relay node and the relay node user equipment.

5 Claims, 14 Drawing Sheets

RELAY STATION DATA TRANSMISSION METHOD

CROSS-REFERENCE TO RELATED APPLICATIONS

This application is the National Stage filing under 35 U.S.C. 371 of International Application No. PCT/KR2010/007655, filed on Nov. 2, 2010, which claims the benefit of earlier filing date and right of priority to Korean Application No. 10-2010-0041242, filed on May 3, 2010, and also claims the benefit of U.S. Provisional Application Ser. Nos. 61/314,605, filed on Mar. 17, 2010, and 61/261,708, filed on Nov. 16, 2009, the contents of which are all incorporated by reference herein in their entirety.

TECHNICAL FIELD

The present invention relates to wireless communication and, more specifically, to a method of a relay station transmitting data in a wireless communication system including a relay stations.

BACKGROUND ART

In International Telecommunication Union Radio communication sector (ITU-R), a standardization task for International Mobile Telecommunication (IMT)-Advanced, that is, the next-generation mobile communication system after the third generation is in progress. IMT-Advanced sets its goal to support Internet Protocol (IP)-based multimedia service at a data transfer rate of 1 Gbps in stop and slow-speed moving states and of 100 Mbps in a fast-speed moving state.

For example, 3$^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

One of systems being taken into consideration in the next-generation wireless communication system is an Orthogonal Frequency Division Multiplexing (OFDM) system capable of attenuating an Inter-Symbol Interference (ISI) effect with low complexity. In OFDM, serially inputted data symbols are converted into N parallel data symbols and are carried on N separated subcarriers and then transmitted. The subcarriers maintain orthogonality in the frequency domain. Each of the orthogonal channels experiences independent frequency selective fading, and thus ISI can be minimized because an interval between transmitted symbols is lengthened. Orthogonal Frequency Division Multiple Access (hereinafter referred to as OFDMA) refers to a multiple access method of realizing multi-access by independently providing some of available subcarriers to users, in a system using OFDM as a modulation method. In OFDMA, frequency resources called subcarriers are provided to each of users, and the frequency resources are commonly independently provided to a plurality of users so that they do not overlap with one another. As a result, frequency resources are exclusively allocated to users.

In an OFDMA system, frequency diversity for multiple users can be obtained through frequency selective scheduling, and subcarriers can be allocated in various forms according to a permutation method for the subcarriers. Furthermore, the efficiency of a spatial region can be increased through a spatial multiplexing scheme using multiple antennas. In order to support the various schemes, a control signal must be transmitted between user equipment and a base station. The control signal includes a Channel Quality Indicator (CQI) reporting a channel state transmitted from user equipment to a base station, an Acknowledgement/Not-acknowledgement (ACK/NACK) signal, that is, a response to data transmission, a bandwidth request signal to request the allocation of a radio resource, precoding information in a multiple antenna system, antenna information, and so on. The control signal is transmitted through a control channel.

Meanwhile, technology being taken into consideration in the next-generation wireless communication system includes a Relay Station (RS). A relay station functions to extend cell coverage and improve transmission performance. When a base station serves user equipment placed at the coverage boundary of the base station through a relay station, there is an advantage in that cell coverage is extended. Furthermore, if a relay station improves the transmission reliability of a signal between a base station and user equipment, transmission capacity can be increased. If user equipment is placed in a shadow region although it is placed within the coverage of a base station, the user equipment may use a relay station. In a wireless communication system including the relay station, OFDMA may be used as modulation technology.

In a relay station, a frequency band used when a signal is transmitted to a base station may be identical with a frequency band used when a signal is received from relay station user equipment connected to the relay station. Alternatively, in a relay station, a frequency band used when a signal is received from a base station may be identical with a frequency band used when a signal is transmitted to relay station user equipment. It is difficult for a relay station to perform the transmission and reception of signals, included in the same frequency band, at the same time owing to self-interference. Accordingly, a relay station has to transmit and receive signals included in the same frequency band by temporally separate transmission and reception from each other.

In a wireless communication system including a relay station, a resource allocation method for a radio resource, for example, a frame is problematic. A method in which a relay station transmits data using a frame allocated thereto as resources is problematic.

DISCLOSURE

Technical Problem

An object of the present invention is to provide a method of a relay station transmitting data.

Technical Solution

A method of a relay node transmitting data according to an aspect of the present invention includes the steps of receiving scheduling information about a backhaul link and data from a base station; receiving channel information about an access link from relay node user equipment; performing scheduling on the access link based on the scheduling information about the backhaul link and the channel information about the access link; and relaying the data to the relay node user equipment according to a result of the scheduling, wherein the backhaul link means a link between the base station and the relay node, and the access link means a link between the relay node and the relay node user equipment.

A method of a relay node transmitting data according to another aspect of the present invention includes the steps of transmitting an access link channel measurement reference signal to relay node user equipment; receiving access link channel information about the access link channel measurement reference signal from the relay node user equipment; receiving a backhaul link channel measurement reference signal from a base station; transmitting backhaul link channel information, obtained by analyzing the backhaul link channel measurement reference signal, and the access link channel information to the base station; receiving access link scheduling information and data to be relayed to the relay node user equipment from the base station; and transmitting the data to the relay node user equipment based on the access link scheduling information.

A method of a relay node transmitting data according to yet another aspect of the present invention includes the steps of transmitting an access link channel measurement reference signal to relay node user equipment; receiving access link channel information about the access link channel measurement reference signal from the relay node user equipment; generating scheduling information about an access link based on the access link channel information; receiving a backhaul link channel measurement reference signal from a base station; transmitting backhaul link channel information, obtained by analyzing the backhaul link channel measurement reference signal, and scheduling information about the access link to the base station; receiving data to be relayed to the relay node user equipment from the base station; and transmitting the data to the relay node user equipment based on the scheduling information about the access link.

A method of a relay node transmitting data according to further yet another aspect of the present invention includes the steps of receiving a backhaul link channel measurement reference signal from a base station; transmitting backhaul link channel information about backhaul link channel measurement reference signal to the base station; transmitting an access link channel measurement reference signal to relay node user equipment; receiving macro scheduling information about a link between the base station and macro user equipment, connected to the base station, and data to be relayed to the relay node user equipment from the base station; receiving access link channel information about the access link channel measurement reference signal from the relay node user equipment; performing scheduling on an access link based on the access link channel information and the macro scheduling information; and transmitting the data to the relay node user equipment according to a result of the scheduling on the access link.

A method of a relay node transmitting data according to still yet another aspect of the present invention includes the steps of a base station receiving channel information about a backhaul link and channel information about an access link from the relay node and receiving macro channel information about a link between the base station and macro user equipment from the macro user equipment; the base station generating scheduling information about the access link based on the channel information about the backhaul link, the channel information about the access link, and the macro channel information; and the base station transmitting the scheduling information about the access link and data to the relay node.

A method of a relay node transmitting data according to further yet another aspect of the present invention includes the steps of a base station receiving channel information about a backhaul link and access link scheduling information, performed by the relay node, from the relay node and receiving macro channel information about a link between the base station and macro user equipment from the macro user equipment; performing scheduling on the backhaul link and the link between the base station and the macro user equipment based on the channel information about the backhaul link, the access link scheduling information, and the macro channel information; and transmitting data to the relay node and the macro user equipment based on a result of the scheduling.

Advantageous Effects

In a wireless communication system including a relay station, a radio resource allocation method is provided. A base station and a relay station can transmit data efficiently according to a radio resource allocation method.

MODE FOR INVENTION $3^{rd}$ Generation Partnership Project (3GPP) Long Term Evolution (LTE) is a part of Evolved UTMS (E-UMTS) using Evolved-UMTS Terrestrial Radio Access (E-UTRA), and it adopts OFDMA in downlink and SC-FDMA in uplink. In order to clarify a description, LTE-Advanced (A) is chiefly described, but the technical spirit of the present invention is not limited thereto.

Figure 1:
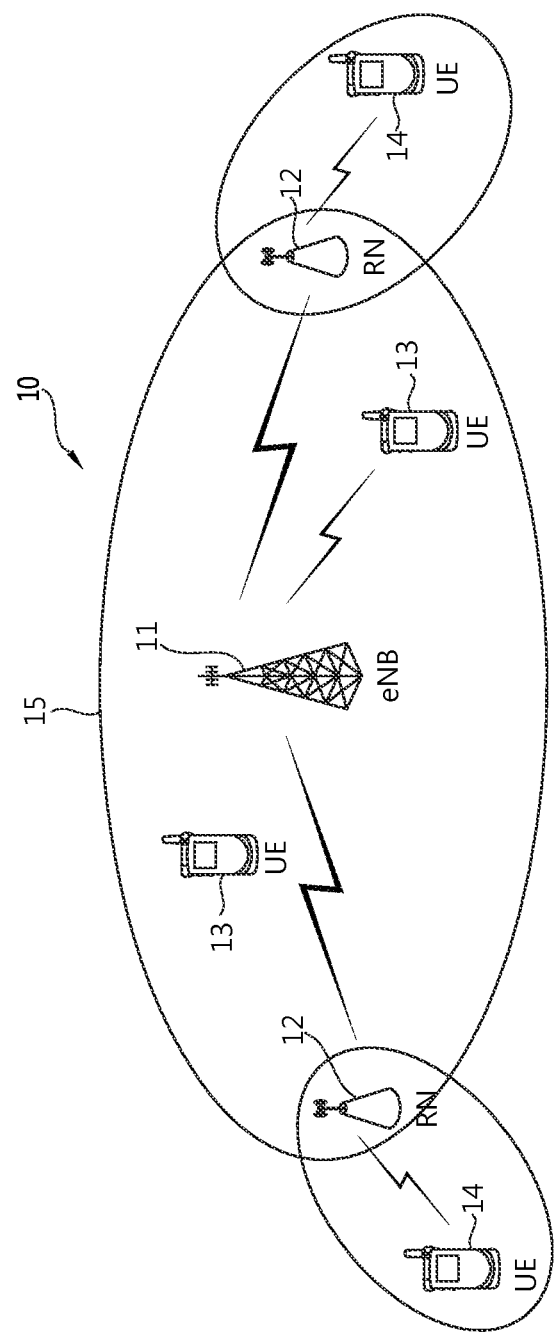
FIG. 1 shows a wireless communication system including a relay station.

FIG. 1 shows a wireless communication system including a relay node.

Referring to FIG. 1, a wireless communication system 10 including relay node includes at least one evolved Node B (eNB) 11. Each eNB 11 provides communication service to a geographical area 15 commonly called a cell. The cell may be classified into a number of areas, and each area is called a sector. One or more cells may exist in one eNB. The eNB 11 commonly refers to a fixed station communicating with User Equipment (UE) 13, and it may be called another terminology, such as a Base Station (BS), a Base Transceiver System (BTS), an access point, an Access Network (AN), or an Advanced BS (ABS). The eNB 11 may perform functions, such as connectivity between a Relay Node (RN) 12 and UE 14, management, control, and resource allocation.

The RN 12 refers to a device relaying a signal between the eNB 11 and the UE 14, and it may be called another terminology, such as a Relay Station (RS), a repeater, a relay, or an Advanced RS. Any scheme, such as Amplify and Forward (AF) and Decode and Forward (DF), may be used as a relay scheme used in an RN, and the technical spirit of the present invention is not limited thereto.

The UE 13, 14 may be fixed or mobile and may be called another terminology, such as an Advanced Mobile Station (AMS), a Mobile Station (MS), a Subscriber Station (SS), a wireless device, a Personal Digital Assistant (PDA), a wireless modem, a handheld device), or an Access Terminal (AT). Hereinafter, macro UE refers to UE directly communicating with the eNB 11, and RN UE refers to UE communicating with an RN. The macro UE 13 may communicate with the eNB 11 via the RN 12 in order to improve the transfer speed according to a diversity effect, although the macro UE 13 is placed within the cell of the eNB 11.

In communication between an eNB and macro UE, downlink (DL) refers to communication from the eNB to the macro UE, and uplink (UL) refers to communication from the macro UE to the eNB. In communication between an eNB and an RN, DL refers to communication from the eNB to the RN, and UL refers to communication from the RN to the eNB. In communication between an eNB and an RN, DL is called backhaul DL, and UL is called backhaul UL. In communication between an RN and an RN UE, DL refers to communication from the RN to the RN UE, and UL refers to communication from the RN UE to the RN. In communication between an RN and RN UE, DL is called access DL, and UL is called access UL.

Figure 2:
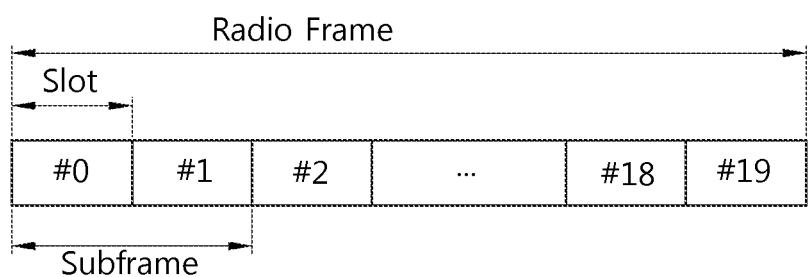
FIG. 2 shows the format of a radio frame.

FIG. 2 shows the format of a radio frame.

Referring to FIG. 2, the radio frame includes 10 subframes. One subframe includes 2 slots. The time taken to transmit one subframe is called a Transmission Time Interval (TTI). For example, the length of one subframe may be 1 ms, and the length of one slot may be 0.5 ms.

Figure 3:
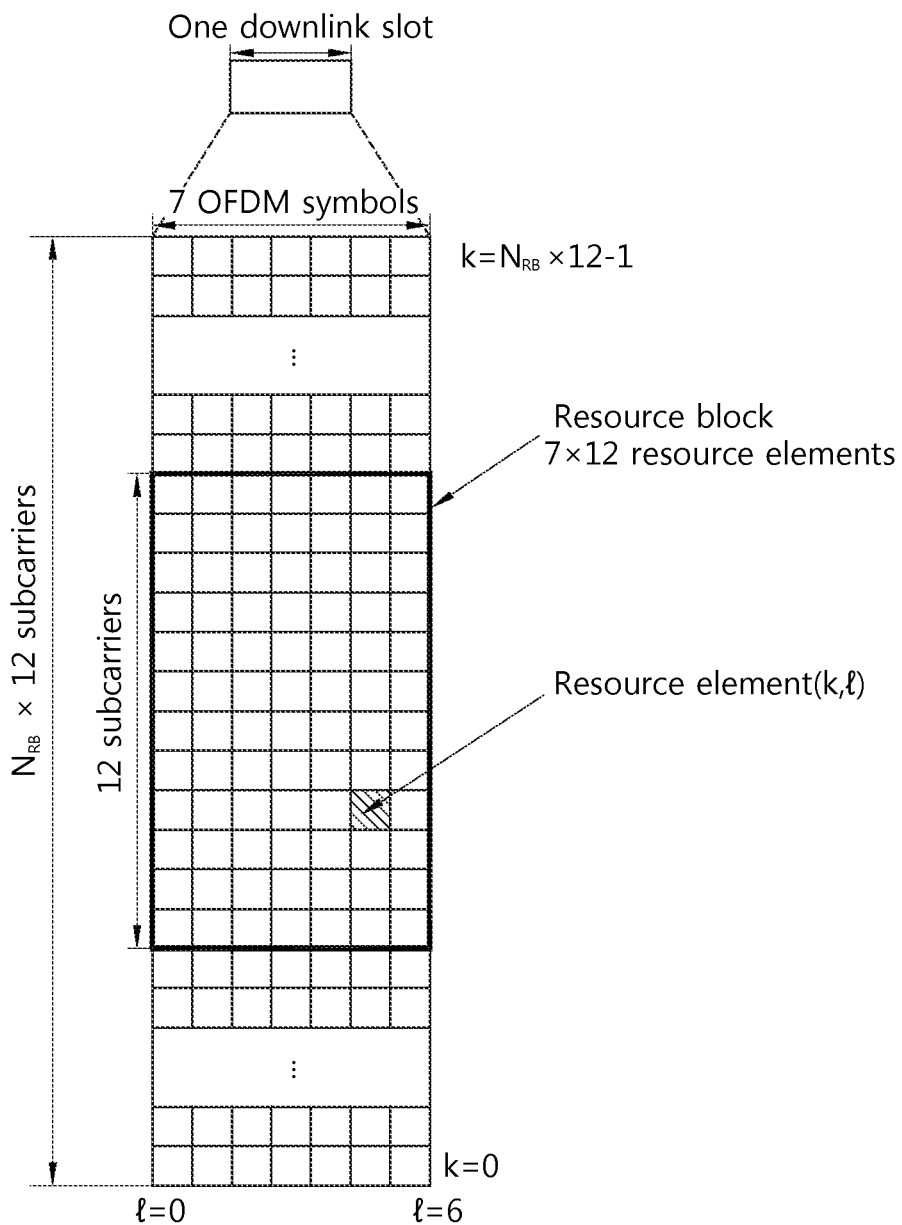
FIG. 3 is an exemplary diagram showing a resource grid for one downlink slot.

FIG. 3 is an exemplary diagram showing a resource grid for one downlink slot.

Referring to FIG. 3, the downlink slot includes a plurality of Orthogonal Frequency Division Multiplexing (OFDM) symbols in the time domain. The OFDM symbol may be called another name according to a multiple access scheme. For example, the OFDM symbol may be called a Single Carrier Frequency Division Multiple Access (SC-FDMA) symbol. The downlink slot may include 7 OFDM symbols. A resource block may include 12 subcarriers in the frequency domain and may include 7 OFDM symbols in the time domain. The number of OFDM symbols included in the downlink slot and the resource block is illustrated as being 7, but not limited thereto. For example, the number of OFDM symbols included in the downlink slot may be 6 depending on the length of a Cyclic Prefix (CP).

Each element on the resource grid is called a Resource Element (RE), and one resource block includes 12×7 REs. The number $N^{DL}$ of resource blocks included in a downlink slot depends on a downlink transmission bandwidth set in a cell.

The resource grid for the downlink slot of FIG. 3 may also be applied to a resource grid for an uplink slot. However, the uplink slot includes a plurality of SC-FDMA symbols in the time domain.

A frame format that may be used in a wireless communication system including an RN and a method of an RN transmitting data using the frame format are now described.

Figure 4:
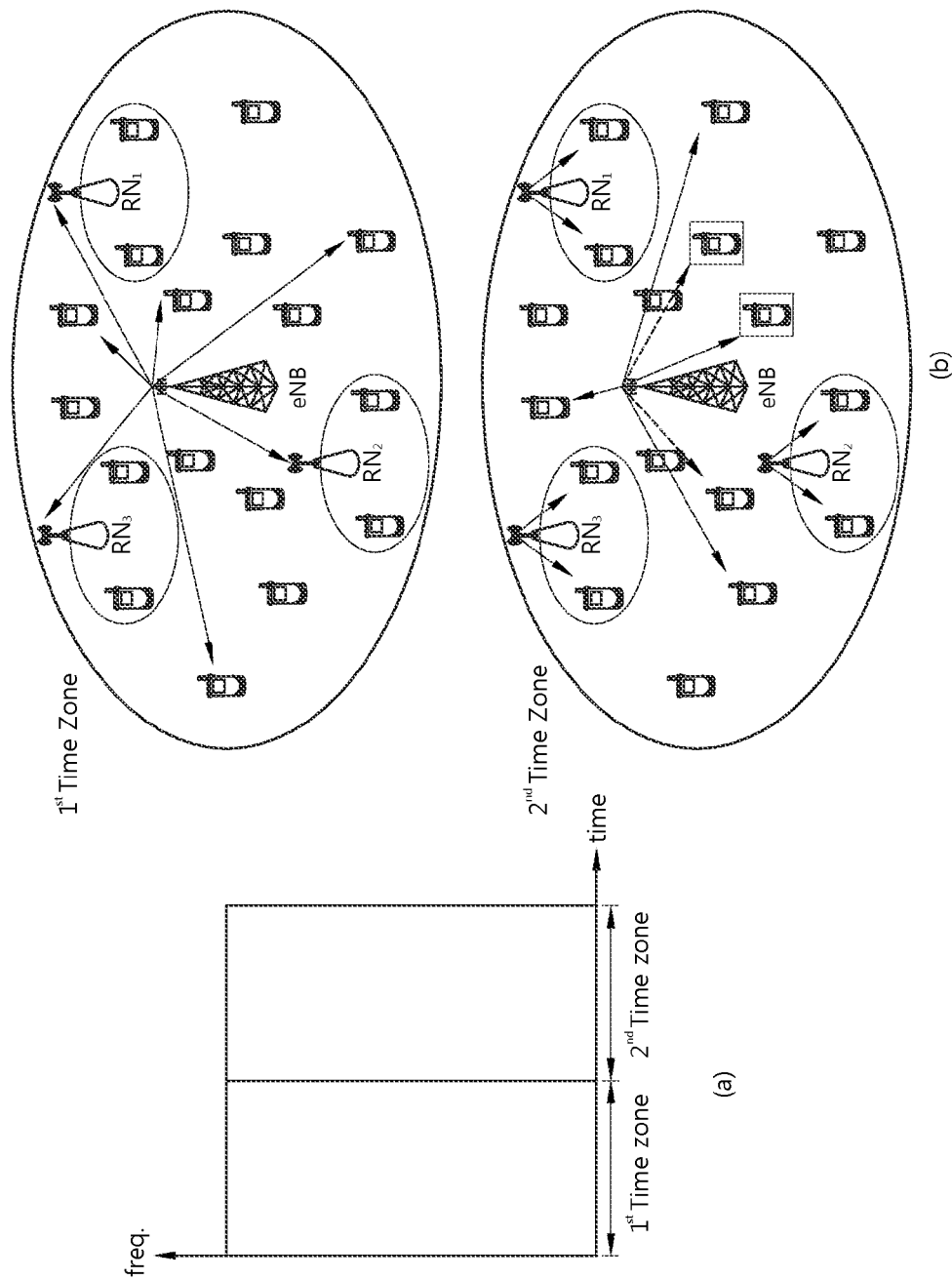
FIG. 4 shows a frame format and a signal transmission operation according to an embodiment of the present invention.

FIG. 4 shows a frame format and a signal transmission operation according to an embodiment of the present invention.

Referring to FIG. 4, a frame may include two time zones. The two time zones are called a first time zone and a second time zone, respectively, for convenience of description.

In the first time zone, communication between an eNB and macro UE and/or communication between an eNB and RN are performed. In the second time zone, communication between an eNB and macro UE and/or communication between an RN and RN UE is performed. From a standpoint of an RN, a time interval in which the RN communicates with an eNB and a time interval in which the RN communicates with RN UE are separated from each other.

Each of the first time zone and the second time zone may be a time interval of, for example, a subframe unit. The first time zone and the second time zone may include the same number of subframes or may include different numbers of subframes. That is, the first time zone and the second time zone may be temporally the same interval or may be temporally different intervals.

Figure 5:
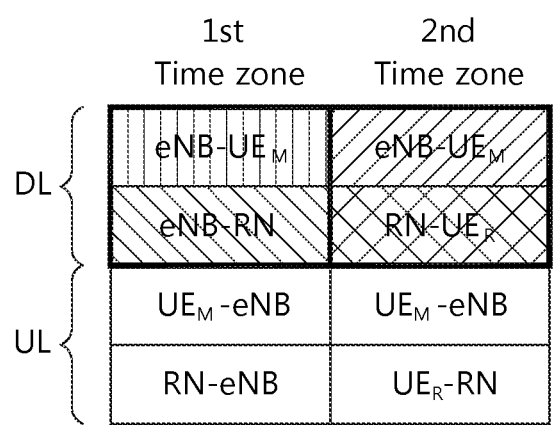
FIG. 5 shows a frame format for semi-static resource allocation.

FIG. 5 shows a frame format for semi-static resource allocation.

Semi-static resource allocation refers to resource allocation using a scheme of continuing to use radio resources allocated based on resource allocation information unless they are not updated or changed based on resource allocation information for a specific time interval. Dynamic resource allocation refers to resource allocation using a scheme capable of allocating radio resources every scheduling unit.

Referring to FIG. 5, in the first time zone of the frame, a radio resource zone where an eNB may communicate with macro UE $UE_M$ and a radio resource zone where the eNB may communicate with an RN may be separately physically allocated to the eNB.

In the second time zone of the frame, a radio resource zone where an eNB may communicate with macro UE $UE_M$ and a radio resource zone where an RN may communicate with an RN UE $UE_R$ may be separately physically allocated to the eNB.

Figure 6:
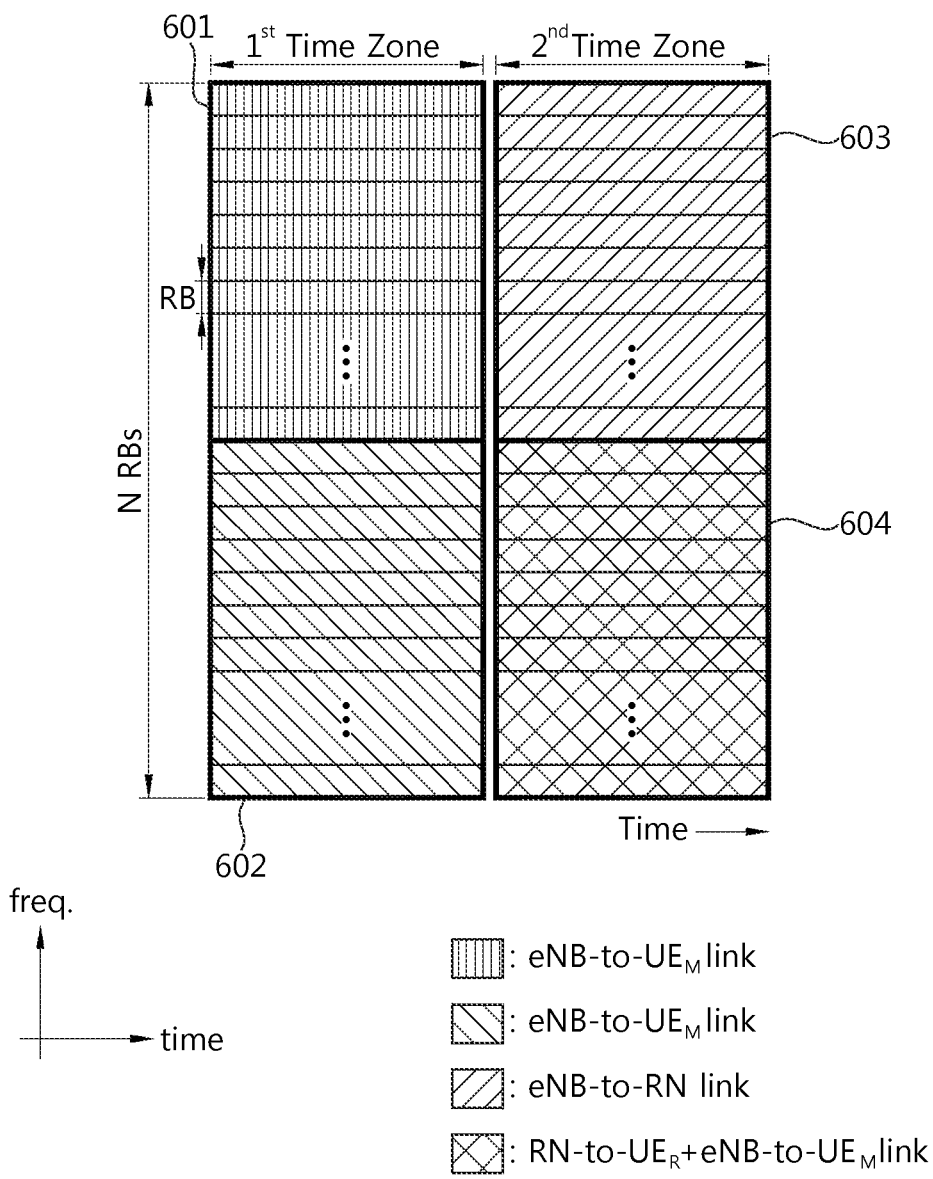
FIG. 6 shows an example in which the semi-static resource allocation has been performed.

FIG. 6 shows an example in which the semi-static resource allocation has been performed.

Referring to FIG. 6, each of a first time zone and a second time zone may include a number of resource blocks. The resource blocks are allocated to an RN or UE through various scheduling schemes, such as Proportional Fairness (PF) and a Maximum Carrier-to-Interference (MAX C/I) ratio.

In a radio resource zone 601, 603 where an eNB may communicate with macro UE $UE_M$ and a radio resource zone 602 where an eNB may communicate with an RN, each of resource blocks is allocated to one link and thus the resource blocks do not overlap with one another. To allocate radio resources (e.g., resource blocks) so that they do not overlap with one another as described above is called a resource non-overlap method.

A resource overlap method is to allocate a radio resource (e.g., a resource block) to two links so that the radio resources overlap with each other. For example, a resource block used for an eNB to communicate with macro UE and a resource block used for an RN to communicate with RN UE may be allocated within a radio resource zone 604 so that they overlap with each other. In case of the resource overlap method, a resource block used for an RN to send a signal to RN UE may be identical with a resource block used for an eNB to send a signal to macro UE. Accordingly, communication between the RN and the RN UE may be affected by interference due to communication between the eNB and the macro UE. The eNB has to solve the interference problem by using a proper power allocation method. The resource overlap method and the resource non-overlap method may be likewise defined from a viewpoint of not only a resource block unit, but also a radio resource zone. That is, depending on whether a radio resource zone is allocated to only one link or a plurality of link, the former may be defined as the resource non-overlap method and the latter may be defined as the resource overlap method.

In accordance with a frame format for the semi-static resource allocation described with reference to FIGS. 5 and 6, an eNB and an RN may perform scheduling in order to allocate radio resources that will be used in communication with macro UE and RN UE in respective independent radio resource zones. In other words, the eNB may allocate radio resources to the macro UE and the RN by independently performing scheduling in a radio resource zone where the eNB may communicate with the macro UE and a radio resource zone where the eNB may communicate with the RN. The RN may allocate radio resources to the RN UE by performing independent scheduling on a radio resource zone where the RN may communicate with the RN UE.

The eNB and the RN need to obtain channel information, for example, a Channel Quality Indication (CQI) for the radio resource zones in order to perform independent scheduling in the radio resource zones separated as described above. The eNB may send a common reference signal to the RN or the macro UE in order to obtain the channel information. The RN may send a common reference signal to the RN UE in order to obtain the channel information. In response to the common reference signal, the RN, the macro UE, or the RN UE generates the channel information and feeds back the generated channel information.

Signaling performed between an eNB, an RN, macro UE $UE_M$, and RN UE $UE_R$ by using the frame format for the semi-static resource allocation is now described.

Figure 7:
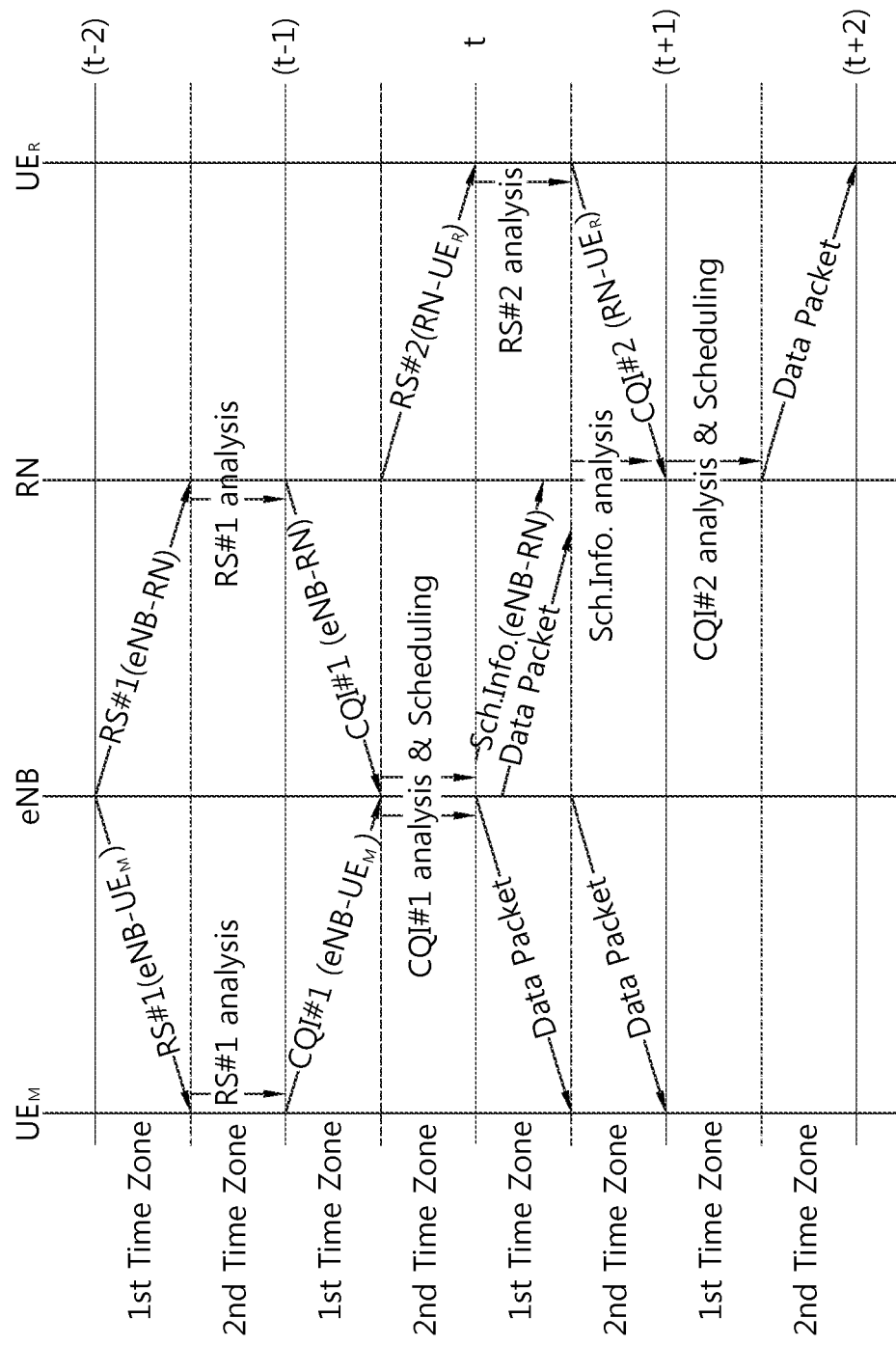
FIG. 7 is a signaling flowchart when the semi-static resource allocation method is used.

FIG. 7 is a signaling flowchart when the semi-static resource allocation method is used.

First, signaling in the link between the eNB and the macro UE is described.

The eNB transmits a common reference signal to all macro UEs $UE_M$ in the first time zone of a point of time (t−2) in order to obtain channel information about downlink. The macro UE generates the channel information by analyzing the common reference signal in the second time zone of the point of time (t−2). The channel information may be, for example, a Channel Quality Indicator (CQI), but not limited thereto. The macro UE feeds back the generated channel information to the eNB through the first time zone of a point of time (t−1). The eNB allocates radio resources to the macro UE by analyzing the channel information fed back from the macro UE and performing scheduling on downlink transmission. The eNB transmits a data packet to the macro UE through the radio resources allocated through a first time zone and a second time zone at a point of time t. In downlink, a time interval taken until the eNB receives the feedback channel information after sending the common reference signal and then transmits the data packet becomes 4 time intervals (transmission in the first time zone of the point of time t) or 5 time intervals (transmission in the second time zone of the point of time t).

Signaling in the backhaul link between the eNB and the RN is described.

The eNB transmits a common reference signal to all RNs in the first time zone of the point of time (t−2) in order to obtain the channel information about the backhaul downlink. The RN generates the channel information by analyzing the common reference signal in the second time zone of the point of time (t−2) and feeds back the generated channel information to the eNB in the first time zone of the point of time (t−1).

The eNB performs scheduling on backhaul downlink transmission by analyzing the channel information fed back from the RN and allocates radio resources to the RN. The eNB transmits scheduling information about the backhaul downlink, together with a data packet, to the RN in the first time zone of the point of time t. The scheduling information about the backhaul downlink may be used for the RN when the RN performs scheduling on an access link.

In the backhaul downlink transmission, a time interval taken until the eNB receives the feedback channel information after sending the common reference signal and then transmits the data packet becomes 4 time intervals.

Signaling in the access link between the RN and the RN UE is described.

The RN transmits a common reference signal to all RN UEs in order to obtain the channel information about the access downlink in the second time zone of the point of time (t−1). The RN UE generates the channel information by analyzing the common reference signal in the first time zone of the point of time t and feeds back the generated channel information to the RN in the second time zone of the point of time t.

The RN performs scheduling on backhaul downlink transmission by analyzing scheduling information about backhaul downlink, received from the eNB in the first time zone of the point of time t, in the second time zone of the point of time t and analyzing the channel information, fed back from the RN UE in the first time zone of the point of time (t+1), based on the analyzed scheduling information and allocates radio resources for the RN UE. The RN transmits a data packet to the RN UE in the second time zone of the point of time (t+1). The scheduling information about the backhaul downlink may be used for the RN when performing scheduling on an access link. As a result, the data packet transmitted from the eNB to the RN in the first time zone of the point of time t is not transmitted to the RN UE in the second time zone of the point of time t, but is transmitted to the RN UE in the second time zone of the point of time (t+1) with a delay of 2 time intervals. Furthermore, in the access downlink transmission, a time interval taken until the RN receives the feedback channel information after sending the common reference signal and then transmits the data packet to the RN UE becomes 4 time intervals.

Figure 8:
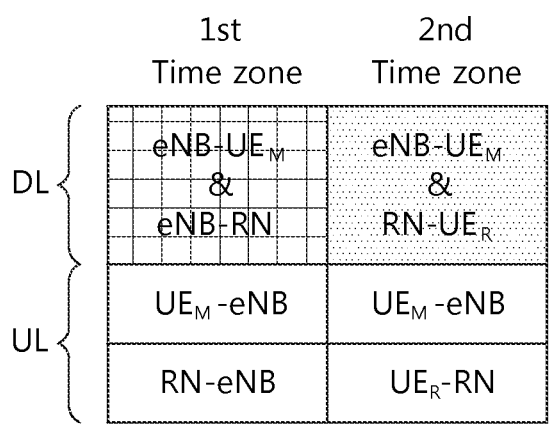
FIG. 8 shows a frame format for dynamic resource allocation.

FIG. 8 shows a frame format for dynamic resource allocation.

Referring to FIG. 8, in the first time zone of the frame, a radio resource zone where an eNB may communicate with macro UE $UE_M$ and a radio resource zone where the eNB may communicate with an RN are overlappingly allocated.

In the second time zone of the frame, a radio resource zone where the eNB may communicate with the macro UE and a radio resource zone where the RN may communicate with RN UE $UE_R$ are overlappingly allocated.

Figure 9:
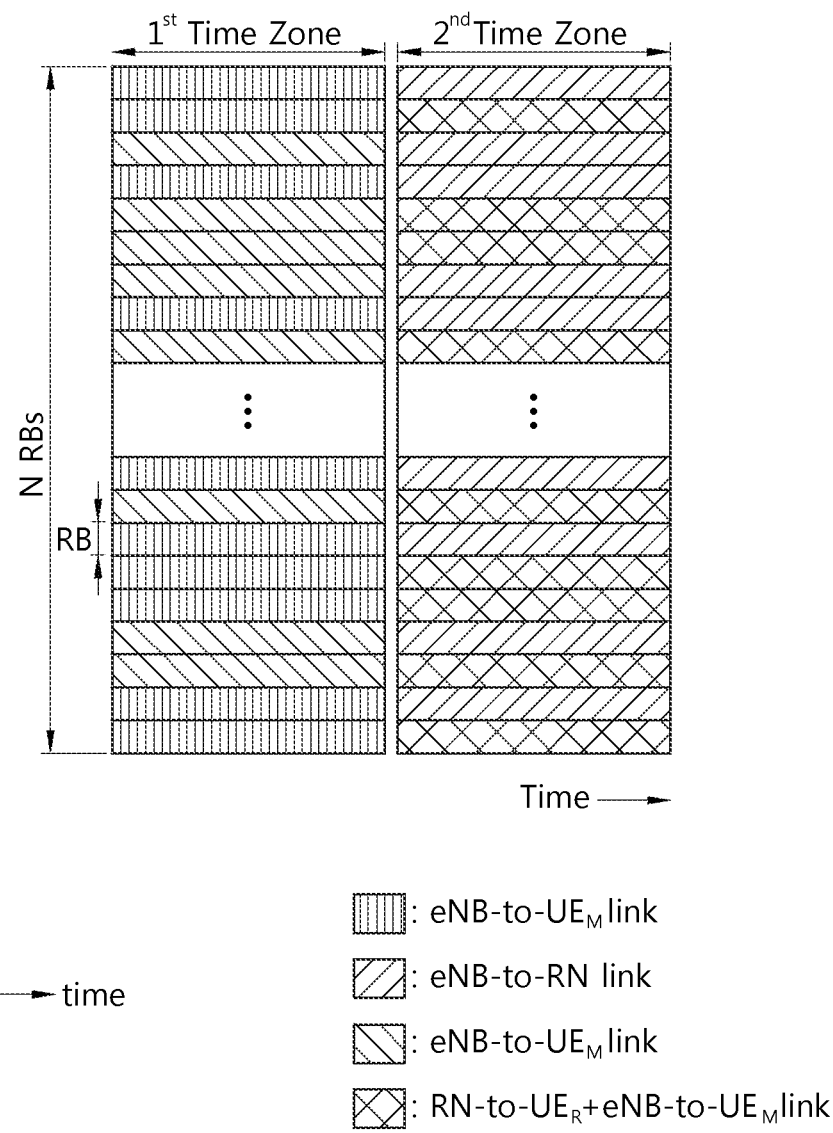
FIG. 9 shows an example in which the dynamic resource allocation has been performed in a frame.

FIG. 9 shows an example in which the dynamic resource allocation has been performed in a frame.

Referring to FIG. 9, in the dynamic resource allocation, radio resource zones that may be used for the communication of respective links in each time zone are not physically distinguished from one another. That is, all resource blocks included in a first time zone are not classified into radio resource zones for respective links, and are allocated for communication between an eNB and macro UE or an eNB and an RN according to various scheduling schemes. Likewise, all resource blocks included in a second time zone are allocated for communication between an eNB and macro UE or an RN and RN UE according to various scheduling schemes. In the dynamic resource allocation, like in the semi-static resource allocation, the resource non-overlap method or the resource overlap method may be used. That is, a resource block may be allocated for communication for one link or may be overlappingly allocated for communication for a plurality of links.

If an eNB and an RN independently perform scheduling when the frame format for the dynamic resource allocation described with reference to FIGS. 8 and 9 is used, the eNB and the RN may allocate the same resource block to macro UE and RN UE, respectively. This is because resource regions that may be used for communication for respective links overlap with one another as described above.

That is, unlike in the frame format for the semi-static resource allocation, in the frame format for the dynamic resource allocation, resource regions that may be used for respective links are not physically distinguished and allocated, but are shared. In the resource regions shared as described above, a different resource block needs to be allocated to each link. For example, in a first time zone, resource regions that may be used for communication between an eNB and macro UE and communication between the eNB and an RN overlap with each other, but different resource blocks must be allocated for the communication between the eNB and the macro UE and the communication between the eNB and the RN within the overlapping resource regions according to a scheduling scheme. Likewise in a second time zone, a resource region that may be used for communication between the eNB and the macro UE and communication between the RN and the RN UE is overlappingly allocated, but resource blocks within the resource region has to be differently allocated depending on the communication of each link.

To this end, the eNB and the RN receive channel information fed back from the macro UE or the RN UE and perform scheduling. When the scheduling information is transferred between the eNB and the RN, data transmission according to a dynamic resource allocation frame format can be performed.

Figure 10:
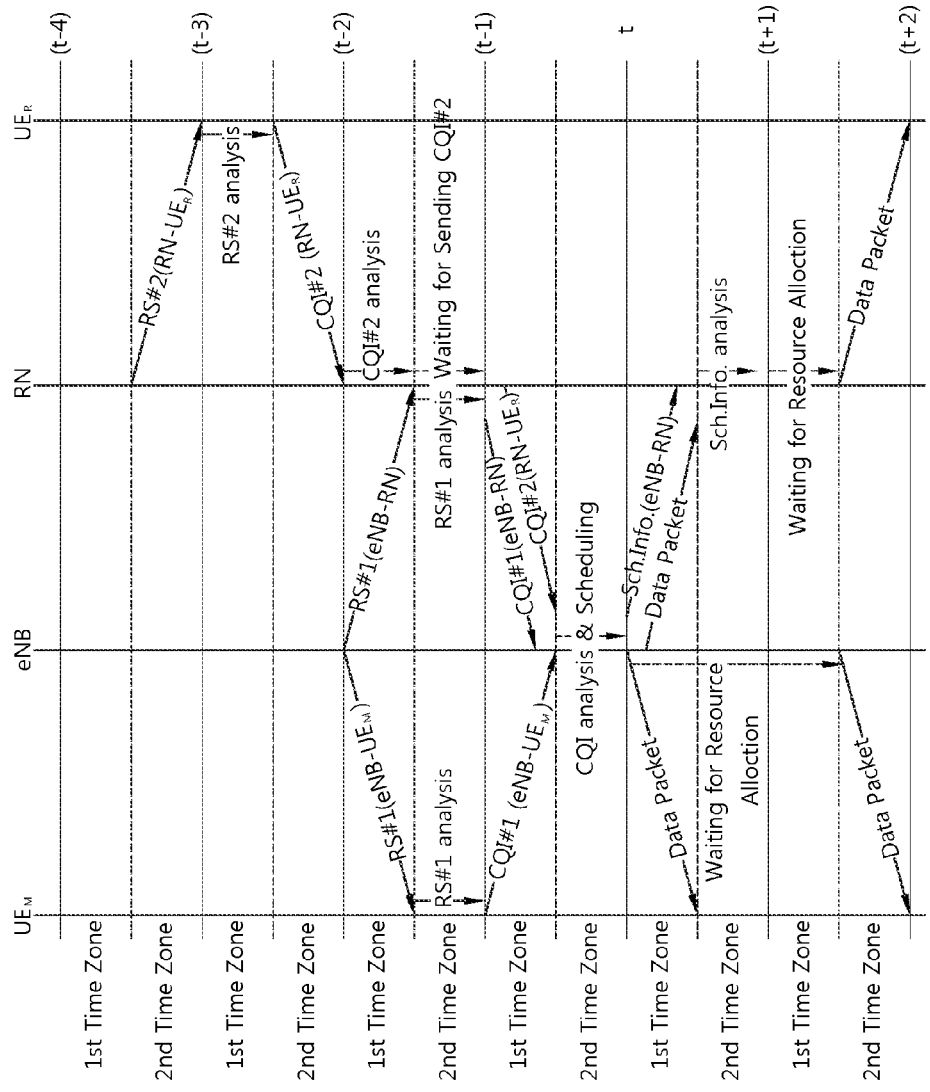
FIG. 10 is a signaling flowchart when the dynamic resource allocation method is used.

FIG. 10 is a signaling flowchart when the dynamic resource allocation method is used.

First, the signaling flow is generally described. An eNB transmits a common reference signal RS#1 to macro UE $UE_M$ and an RN, and the macro UE and the RN transmits respective pieces of channel information about downlink and backhaul downlink to the eNB by analyzing the common reference signal. Furthermore, the RN transmits a common reference signal RS#2 to RN UE $UE_R$, receives feedback channel information about access downlink, and then transmits the channel information about the access downlink to the eNB.

The eNB performs scheduling in order to allocate resources for the respective links by analyzing the pieces of channel information about the downlink, the backhaul downlink, and the access downlink. This dynamic resource allocation method is different from the semi-static resource allocation method in that the eNB performs scheduling on all the links.

The RN does not perform additional scheduling because the eNB transmits the scheduling information about the access downlink to the RN. The RN allocates radio resources based on the scheduling information about the access downlink, received from the eNB, and transmits a data packet to the RN UE.

Signaling in each link is now described in detail. First, signaling in the link between the eNB and the macro UE is described.

The eNB transmits a common reference signal to all macro UEs in the first time zone of a point of time (t−2) in order to obtain the channel information about the downlink. The macro UE generates the channel information by analyzing the common reference signal in the second time zone of the point of time (t−2). The macro UE feeds back the generated channel information to the eNB through the first time zone of a point of time (t−1). The eNB analyzes the channel information fed back from the macro UE and allocates radio resources to the macro UE by performing scheduling on downlink transmission. The eNB transmits a data packet to the macro UE through radio resources allocated through the first time zone of a point of time t and the second time zone of a point of time (t+1). Here, unlike in the semi-static resource allocation method, the eNB transmits the data packet to the macro UE in the second time zone of the point of time (t+1) not in the second time zone of the point of time t. The reason why the eNB transmits the data packet to the macro UE in the second time zone of the point of time (t+1) not in the second time zone of the point of time t is that the eNB performs scheduling on the same resource region for the downlink and the access downlink in relation to the second time zone of a frame and gives the RN the time for analyzing the access downlink scheduling information. The RN may send a signal to the RN UE in the second time zone, but it is difficult for the RN to send the signal because the RN has to analyze the access downlink scheduling information received from the eNB in the second time zone of the point of time t. Accordingly, the RN can send the signal to the RN UE in the second time zone of the point of time (t+1). The eNB transmits the data packet to the macro UE in the second time zone of the point of time (t+1) not in the second time zone of the point of time t by taking the above point of time into consideration.

In the link between the eNB and the macro UE, a time interval taken until the eNB transmits the data packet after sending the common reference signal becomes 4 time intervals (the first time zone of the point of time t) or 7 time intervals (the second time zone of the point of time t+1).

Signaling in the backhaul link between the eNB and the RN is described.

The eNB transmits the common reference signal to all the RNs in the first time zone of a point of time (t−2) in order to obtain the channel information about the backhaul downlink. The RN generates backhaul channel information by analyzing the common reference signal in the second time zone of the point of time (t−2) and feeds back the backhaul channel information to the eNB in the first time zone of the point of time (t−1). Here, the RN transmits the channel information about the access downlink, received from the RN UE in the second time zone of a point of time (t−3), to the eNB along with the backhaul channel information. In this case, the eNB can perform scheduling by using all the pieces of channel information about the downlink, the backhaul downlink, and the access downlink.

The eNB performs scheduling on all the links in the second time zone of the point of time (t−1) and then transmits a data packet to the RN in the first time zone of the point of time t. At this time, the eNB also transmits the scheduling information about the access downlink. In the backhaul downlink transmission, a time interval taken until the eNB receives the feedback channel information after sending the common reference signal and then transmits the data packet to the RN through the above process becomes 4 time intervals.

Signaling in the access link between the RN and the RN UE is described.

The RN transmits the common reference signal to all the RN UEs in the second time zone of a point of time (t−4) in order to obtain the channel information about the access downlink. The RN UE generates the channel information by analyzing the common reference signal in the first time zone of a point of time (t−3) and feeds back the access downlink channel information to the RN in the second time zone of the point of time (t−3).

The RN analyzes the access downlink channel information, received from the RN UE, in the first time zone of the point of time (t−2) and transmits the analyzed information to the eNB in the first time zone of the point of time (t−1). The RN receives a data packet and scheduling information about the access downlink from the eNB in the first time zone of the point of time t. The RN performs resource allocation by analyzing the scheduling information about the access downlink in the second time zone of the point of time t. Furthermore, the RN transmits a data packet to the RN UE in the second time zone of the point of time (t+1). As a result, the data packet transmitted from the eNB to the RN in the first time zone of the point of time t is not transmitted to the RN UE in the second time zone of the point of time t and is transmitted to the RN UE in the second time zone of the point of time (t+1) with a delay of 2 time intervals. A time interval taken until the RN receives the feedback access downlink channel information after sending the common reference signal to the RN UE and then transmits the data packet to the RN UE becomes 10 time intervals.

Figure 11:
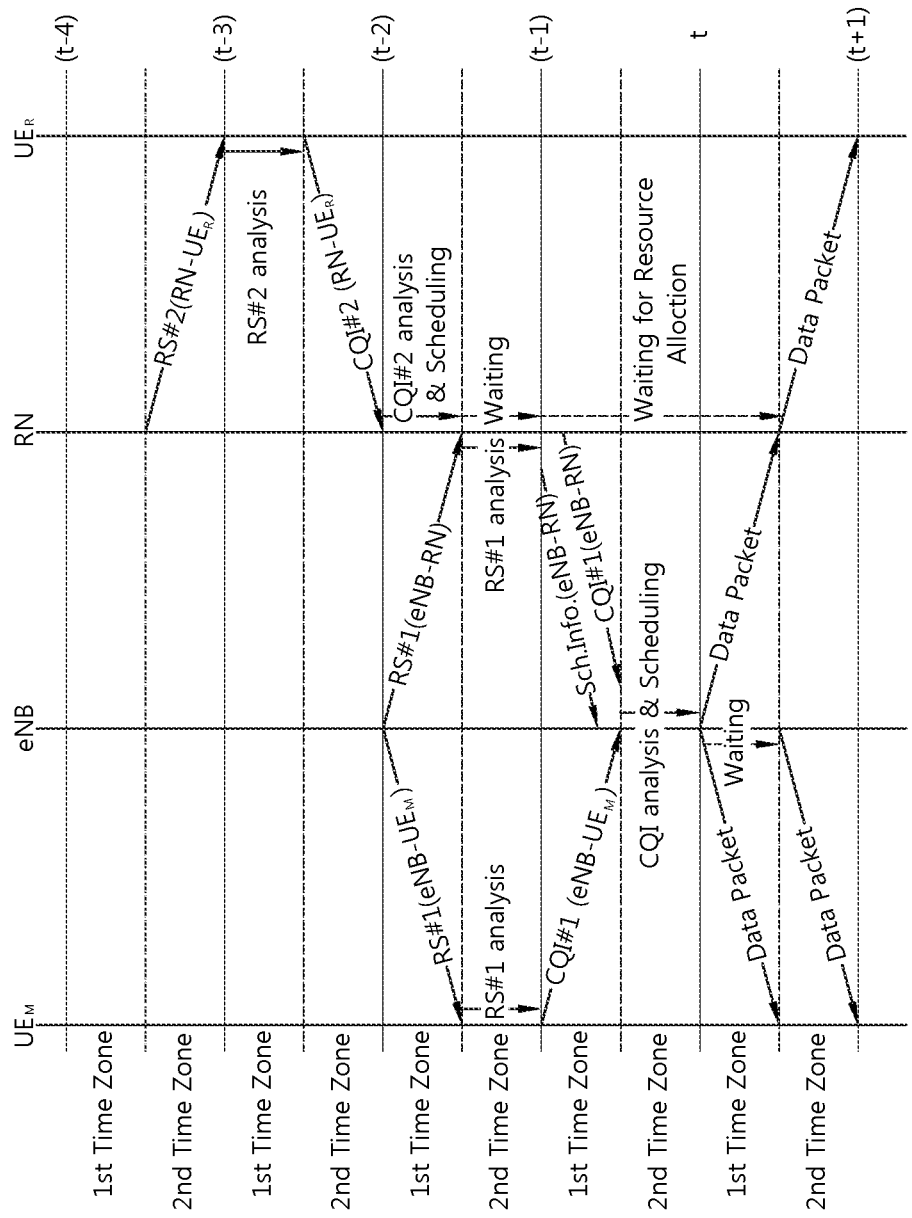
FIG. 11 shows another example of a signaling flowchart when the dynamic resource allocation method is used.

FIG. 11 shows another example of a signaling flowchart when the dynamic resource allocation method is used.

First, the signaling flow is generally described. An eNB transmits a common reference signal RS#1 to macro UE and an RN, and the macro UE and the RN transmits respective pieces of channel information about downlink and backhaul downlink to the eNB by analyzing the common reference signal. When sending the channel information about the backhaul downlink to the eNB, the RN also transmits scheduling information about an access link. That is, the RN independently performs scheduling on the RN-RN UE link without channel information about the eNB-macro UE link and transmits the scheduling information about the access link to the eNB.

The eNB receives the channel information from the RN and the macro UE and receives the scheduling information about the access link from the RN. The eNB performs scheduling on the eNB-macro UE link and the eNB-RN link on the basis of the channel information and the scheduling information.

That is, unlike in the dynamic resource allocation method described with reference to FIG. 10, in the method described with reference to FIG. 11, priority is given to the resource allocation of the RN-RN UE link. In other words, the method of FIG. 11 differs from the dynamic resource allocation method of FIG. 10 in that the RN first performs scheduling on the access link. Then the BS receives the scheduling information about the access link from the RN and then performs scheduling on the eNB-macro UE link and the eNB-RN link. For example, the eNB may not perform resource allocation for frequency-time resources, used in communication between the RN and the RN UE, on the basis of the scheduling information about the access link. According to this method, interference between an RN cell and an eNB cell can be reduced. Alternatively, the frequency-time resources may be overlappingly allocated to the RN cell and the eNB cell, but the reuse ratio of radio resources may be maximized through power control.

The scheduling information about the access link may include all or part of pieces of information, such as a Modulation Coding Scheme (MCS) and an allocation power amount used in the frequency-time zone allocated to each RN UE within the RN cell. The scheduling information about the access link may differ depending on the degree of cooperation between the eNB and the RN.

Furthermore, a method in which the eNB performs scheduling based on the scheduling information about the access link received from the RN and returns all or part of pieces of resulting information to the RN is possible. In this case, the information returned from the eNB to the RN may be used for other uses in addition to a use to check that the eNB has received the scheduling information about the access link from the RN. For example, if the eNB allocates radio resources, partially overlapping with radio resources allocated to the access link, to a link between the eNB and the macro UE or the eNB-RN link, the RN may perform subsequent scheduling on an access link by using the information returned from the eNB to the RN. In this case, the RN may determine whether the radio resources allocated by the eNB and the RN are identical with each other by using the information returned from the eNB. When the RN feeds back the scheduling information about the access link to the eNB and the eNB transmits the scheduling information or the check information to the RN as described above, mutual cooperation scheduling can be efficiently performed.

Signaling in each link is described in detail. First, signaling in the link between the eNB and the macro UE is described.

The eNB transmits a common reference signal to all macro UEs in the first time zone of a point of time (t−2) in order to obtain the channel information about the downlink. The macro UE generates the channel information by analyzing the common reference signal in the second time zone of the point of time (t−2). The macro UE feeds back the generated channel information to the eNB through the first time zone of a point of time (t−1). The eNB analyzes the pieces of channel information fed back from the macro UE and the RN and the access link scheduling information received from the RN and allocates radio resources to the macro UE by performing scheduling on downlink transmission in the second time zone of the point of time (t−1). The eNB transmits a data packet to the macro UE through the first time zone and the second time zone of a point of time t. In the link between the eNB and the macro UE, a time interval taken until the eNB transmits the data packet after sending the common reference signal becomes 4 time intervals (the first time zone of the point of time t) or 5 time intervals (the second time zone of the point of time t). If the eNB transmits the data packet to the macro UE through the second time zone, the time equivalent to 2 time intervals can be reduced as compared with the method described with reference to FIG. 11.

Signaling in the backhaul link between the eNB and the RN is described.

The eNB transmits a common reference signal to all RNs in order to obtain the channel information about the backhaul downlink in the first time zone of the point of time (t−2). The RN generates backhaul channel information by analyzing the common reference signal in the second time zone of the point of time (t−2) and feeds back the backhaul channel information to the eNB in the first time zone of the point of time (t−1). At this time, the RN also transmits scheduling information about access downlink to the eNB. The scheduling information about the access downlink has been generated in the first time zone of the point of time (t−2) based on channel information about access downlink received from the RN UE in the second time zone of a point of time (t−3).

The eNB performs scheduling on the eNB-macro UE link and the eNB-RN link by using the pieces of channel information fed back from the macro UE and the RN and the scheduling information about the access link received from the RN, in the second time zone of the point of time (t−1).

In the eNB-RN link, a time interval taken until the eNB transmits a data packet after sending the common reference signal becomes 4 time intervals.

Signaling in the access link between the RN and the RN UE is described.

The RN transmits a common reference signal to all RN UEs in the second time zone of a point of time (t−4) in order to obtain the channel information about the access downlink. The RN UE generates the channel information by analyzing the common reference signal in the first time zone of a point of time (t−3) and feeds back the access downlink channel information to the RN in the second time zone of the point of time (t−3).

The RN analyzes the access downlink channel information received from the RN UE and performs scheduling on the access link in the first time zone of the point of time (t−2). The RN transmits the scheduling information about the access link and the channel information about the backhaul downlink to the eNB in the first time zone of the point of time (t−1). The RN receives a data packet from the eNB in the first time zone of the point of time t. The RN relays the data packet to the RN UE in the second time zone of the point of time t.

In this method, the RN performs scheduling prior to the eNB. As a result, a time interval taken until the RN transmits the common reference signal to the RN UE, receives the feedback access downlink channel information, and then transmits the data packet to the RN UE becomes 8 time intervals.

Figure 12:
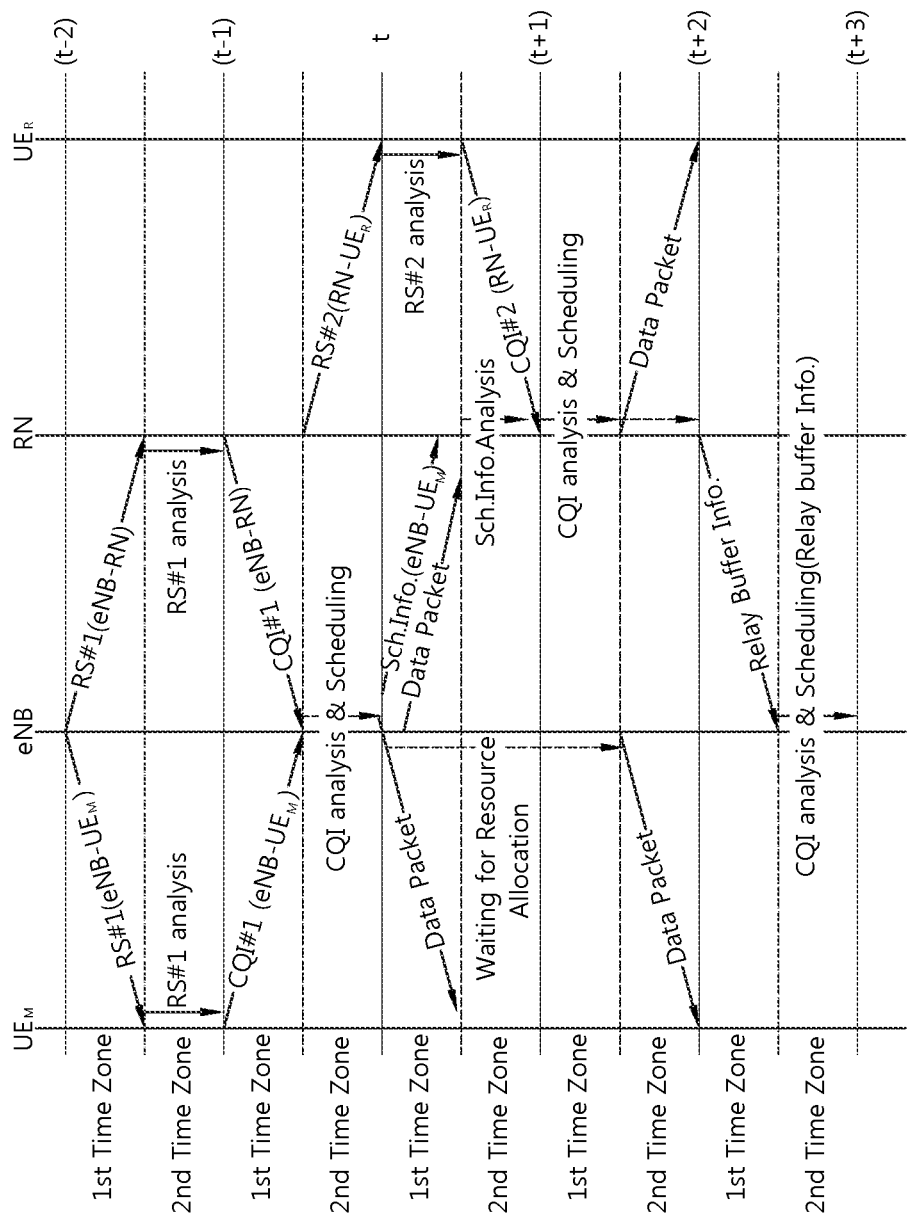
FIG. 12 shows yet another example of a signaling flowchart when the dynamic resource allocation method is used.

FIG. 12 shows yet another example of a signaling flowchart when the dynamic resource allocation method is used.

First, the signaling flow is generally described. An eNB transmits a common reference signal to macro UE and an RN, and the macro UE $UE_M$ and the RN analyze the common reference signal and send respective pieces of channel information about downlink and backhaul downlink to the eNB. Furthermore, the RN transmits the common reference signal to RN UE $UE_R$, and the RN UE analyzes the common reference signal and transmits channel information about access downlink to the RN.

The eNB performs scheduling on a link using the first time zone of each frame and a link between the eNB and the macro UE using the second time zone of each frame. Furthermore, the eNB transmits scheduling information about the link between the eNB and the macro UE to the RN.

The RN receives the scheduling information about the link between the eNB and the macro UE from the eNB and performs scheduling on an access link by taking the scheduling information into consideration. In the scheduling order of the eNB and the RN is eNB first and the RN second. In this case, the scheduling information about the link between the eNB and the macro UE is used in the scheduling of the RN.

The RN transmits a data packet to the RN UE and then feeds back information about an RN buffer to the eNB. Then, the eNB may perform scheduling on a backhaul link by taking the information about the RN buffer into consideration because it can know the state of the RN buffer.

The scheduling information transmitted from the eNB to the RN may include information about whether what frequency-time zone has been allocated to macro UE within an eNB cell and about an MCS and allocation power. For example, if the RN does not perform resource allocation for the RN UE in relation to the frequency-time zone allocated to the macro UE by the eNB, interference between the eNB cell and the RN cell can be reduced. If the RN overlappingly allocates a resource region, allocated to the macro UE by the eNB, to the RN UE, the reuse ratio of radio resources can be increased through power control.

Signaling in the link between the eNB and the macro UE is described.

The eNB transmits a common reference signal to all macro UEs in order to obtain the channel information about the downlink in the first time zone of a point of time (t−2). The macro UE generates channel information by analyzing the common reference signal in the second time zone of the point of time (t−2). The macro UE feeds back the channel information to the eNB through the first time zone of a point of time (t−1). The eNB analyzes the pieces of channel information fed back from the macro UE and the RN and the access link scheduling information received from the RN in the second time zone of the point of time (t−1) and allocates radio resources to the macro UE by performing scheduling on downlink transmission. The eNB transmits a data packet to the macro UE through the radio resources allocated through the first time zone of a point of time t. Furthermore, the eNB transmits a data packet to the macro UE through the second time zone of a point of time (t+1).

Here, the number of resource blocks to be allocated to the link between the eNB and the macro UE in the second time zone of the point of time (t+1) may be previously determined depending on the number of macro UEs and RN UEs within a cell, and radio resources equivalent to the number of resource blocks may be dynamically allocated to the link between the eNB and the macro UE. For example, it is assumed that the total number of UEs within a cell is 25, the number of macro UEs is 15, and the number of RN UEs is 10. In this case, the macro UE: the RN UE becomes 3:2. Assuming that a total of 50 resource blocks exist in one time zone, the number of resource blocks allocated to the macro UEs is 30 and the number of resource blocks allocated to the RN UEs is 20. Wireless resources may be allocated according to a ratio of UEs within a cell as described above, but the ratio may be controlled according to priority of a system, etc.

In the link between the eNB and the macro UE, a time interval taken until the eNB transmits the common reference signal and then transmits the data packet becomes 4 time intervals (the first time zone of the point of time t) or 7 time intervals (the second time zone of the point of time t+1).

Signaling in the backhaul link between the eNB and the RN is described.

The eNB transmits a common reference signal to all RNs in the first time zone of the point of time (t−2) in order to obtain the channel information about the backhaul downlink. The RN generates the backhaul channel information by analyzing the common reference signal in the second time zone of the point of time (t−2) and feeds back the generated channel information to the eNB in the first time zone of the point of time (t−1).

The eNB performs scheduling on the eNB-macro UE link and the eNB-RN link by using the pieces of channel information fed back from the macro UE and the RN in the second time zone of the point of time (t−1). The eNB transmits a data packet to the RN in the first time zone of the point of time t. At this time, the eNB also transmits the scheduling information about the eNB-macro UE link to the RN. The scheduling information about the eNB-macro UE link may be used for the RN when performing scheduling on the access link.

In the eNB-RN link, a time interval taken until the eNB transmits the common reference signal and then transmits the data packet becomes 4 time intervals.

Signaling in the access link between the RN and the RN UE is described.

The RN transmits a common reference signal all RN UEs in the second time zone of the point of time (t−1) in order to obtain the channel information about the access downlink. The RN UE generates the channel information by analyzing the common reference signal in the first time zone of the point of time t and feeds back the access downlink channel information to the RN in the second time zone of the point of time t.

The RN analyzes the access downlink channel information received from the RN UE and the scheduling information (about the eNB-macro UE link) received from the eNB and performs scheduling on the access link in the first time zone of the point of time (t+1). The RN transmits a data packet to the RN UE in the second time zone of the point of time (t+1).

In this method, a time interval taken until the RN transmits the common reference signal to the RN UE, receives the feedback access downlink channel information, and then transmits the data packet to the RN UE becomes 4 time intervals. Accordingly, 6 time intervals and 4 time intervals are reduced as compared with the dynamic allocation methods 1 and 2, respectively.

In FIGS. 7 and 10 to 12, it has been assumed that the time taken for the eNB or the RN to perform scheduling after receiving the channel information or the scheduling information is one time zone. However, the assumption is only illustrative, but the present invention is not limited thereto. In case of downlink in which a signal is transmitted from an eNB to macro UE in LTE, when the eNB transmits data to UE in an subframe n, the macro UE transmits a response to the data, that is, Hybrid Automatic Repeat Request (HARQ) and acknowledgement/negative-acknowledgement (ACK/NACK) to the eNB in an subframe (n+4). In response thereto, the eNB re-transmits data in a subframe (n+8) or, if scheduling is impossible at this time, performs scheduling on another subsequent time and then transmits the data. Meanwhile, in case of uplink in which macro UE transmits a signal to an eNB, if UE has transmitted a signal in an subframe n, the UE is fixedly operated to perform re-transmission in an subframe (n+8) if the re-transmission is necessary. That is, the time taken for scheduling may be differently set depending on a system or a standard. Accordingly, in FIGS. 7 and 10 to 12, an order between signalings is maintained, but an interval between the signalings may be changed.

Figure 13:
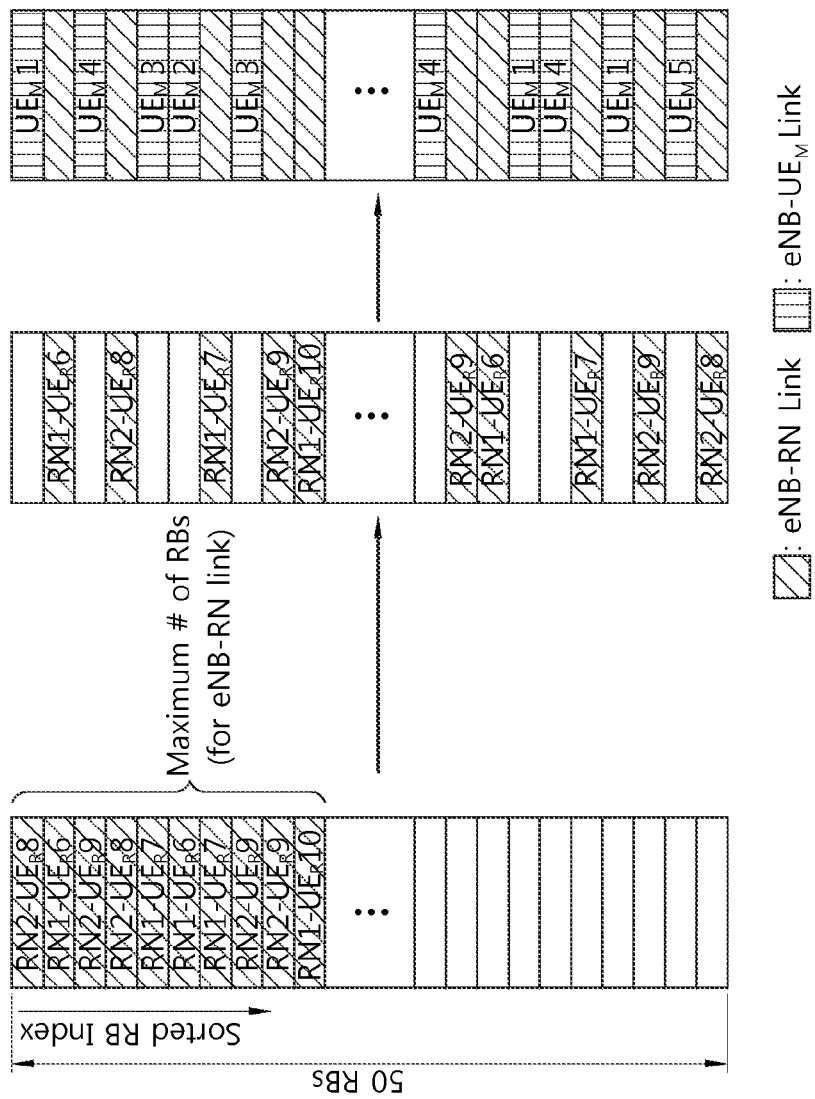
FIG. 13 shows an example of resource allocation for a first time zone in the dynamic resource allocation method of FIG. 12.

FIG. 13 shows an example of resource allocation for a first time zone in the dynamic resource allocation method of FIG. 12.

In the first time zone, resources for an eNB-RN link may be first allocated. For example, after resource blocks are sorted according to the average transmission rate of the eNB-RN link, resource blocks having a high average transmission rate may be first subject to Proportional Fairness (PF) scheduling and then allocated. PF scheduling is only illustrative, and another scheduling scheme, such as a Maximum Carrier-to-Interference (Max C/I) ratio, may be used.

The number of resource blocks allocated to the eNB-RN link may be determined in proportion to the number of RN UEs among the macro UEs and the RN UEs. Alternatively, the number of resource blocks may be determined according to priority determined in a wireless communication system.

When the resource allocation for the eNB-RN link is performed, resources for the RN UEs are allocated by taking information about an RN buffer, fed back from the RN, into consideration.

Resources are allocated to resource blocks remaining after allocating the resources to the eNB-RN link by performing PF scheduling on the eNB-macro UE link.

That is, in the first time zone, resource allocation may be performed in order of the eNB-RN link and the eNB-macro UE link. However, an order of resource allocation may be changed according to priority of a system.

Figure 14:
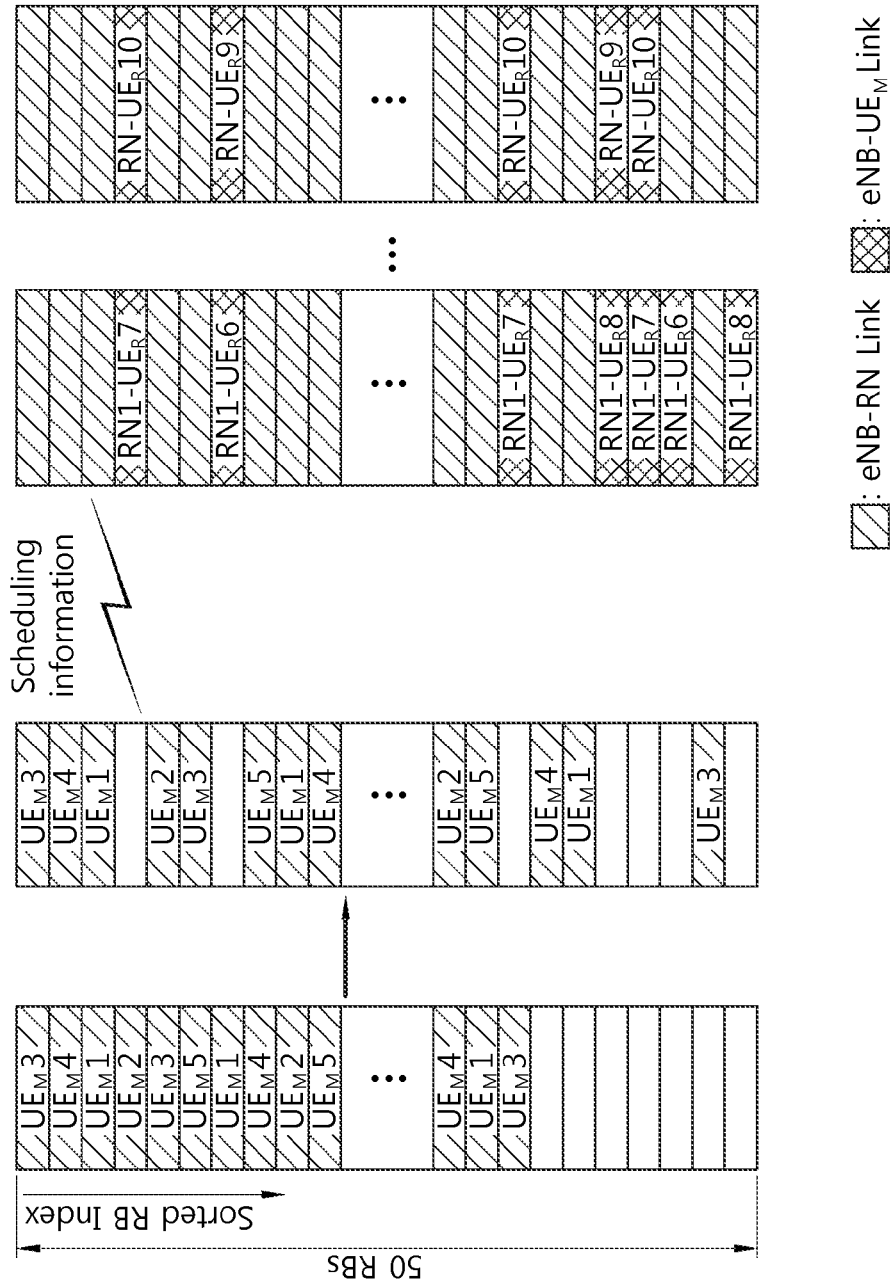
FIG. 14 shows an example of resource allocation for a second time zone in the dynamic resource allocation method of FIG. 12.

FIG. 14 shows an example of resource allocation for a second time zone in the dynamic resource allocation method of FIG. 12.

In the second time zone, resource allocation for an eNB-macro UE link may be first performed. The number of resource blocks allocated to the eNB-macro UE link may be determined in proportion to the number of RN UEs among the macro UEs and the RN UEs. Alternatively, the number of resource blocks may be determined according to priority determined in a system.

When the resource allocation for the eNB-macro UE link is performed, the resource blocks are sorted according to the average transmission rate of the eNB-macro UE link. Next, resources are sequentially allocated to resource blocks having a higher average transmission rate through PF scheduling.

The eNB transmits scheduling information, such as positions where the resources have been allocated and the transmission rate allocated to each RN UE, to the RN. Each RN receives the scheduling information from the eNB and performs the PF scheduling by taking the transmission rate allocated to the remaining resource blocks into consideration. Through the PF scheduling, the RN allocates resources to an RN-RN UE link. The RN feeds back RN buffer information including information, such as the amount of data of the RN UE remaining in the RN, to the eNB so that resources are not wasted.

The present invention may be implemented using hardware, software, or a combination of them. In hardware implementations, the present invention may be implemented using Application Specific Integrated Circuits (ASICs), Digital Signal Processors (DSPs), Programmable Logic Devices (PLDs), Field Programmable Gate Arrays (FPGAs), processors, controllers, microprocessors, other electronic units, or a combination of them, which are designed to perform the above function. In software implementations, the present invention may be implemented using a module performing the above function. The software may be stored in the memory and executed by the processor. The memory or the processor may adopt various means well known to those skilled in the art.

Although the preferred embodiments of the present invention have been described in detail, a person having ordinary skill in the art will appreciate that the present invention may be modified in various ways without departing from the spirit and scope of the present invention defined in the appended claims. Accordingly, a change of future embodiments of the present invention may not deviate from the technology of the present invention.

The invention claimed is:
1. A method of a relay node transmitting data, the method comprising:
transmitting, by a Relay Node (RN) via a second time zone, an access link channel measurement reference signal to a relay node user equipment;

receiving, by the RN via the second time zone, access link channel information about the access link channel measurement reference signal from the relay node user equipment;

generating, by the RN via a first time zone, scheduling information about an access link based on the access link channel information;

receiving, by the RN via the first time zone, a backhaul link channel measurement reference signal from a base station;

transmitting, by the RN via the first time zone, backhaul link channel information, obtained by measuring the backhaul link channel measurement reference signal, and scheduling information about the access link to the base station;

receiving, by the RN via the first time zone, data to be relayed to the relay node user equipment from the base station; and transmitting, by the RN via the second time zone, the data to the relay node user equipment based on the scheduling information about the access link.

2. The method of claim 1, wherein a radio resource zone where the relay node is able to communicate with the base station and a radio resource zone where the relay node is able to communicate with the relay node user equipment overlap with a radio resource zone where the base station is able to communicate with the macro user equipment.

3. A method of a relay node transmitting data, the method comprising:

receiving, by a Relay Node (RN) via a first time zone, a backhaul link channel measurement reference signal from a base station;

transmitting, by the RN via the first time zone, backhaul link channel information about backhaul link channel measurement reference signal to the base station;

transmitting, by the RN via a second time zone, an access link channel measurement reference signal to a relay node user equipment;

receiving, by the RN via the first time zone, macro scheduling information about a link between the base station and a macro user equipment, connected to the base station, and data to be relayed to the relay node user equipment from the base station;

receiving, by the RN via the second time zone, access link channel information about the access link channel measurement reference signal from the relay node user equipment;

performing, by the RN via the first time zone, scheduling on an access link based on the access link channel information and the macro scheduling information; and transmitting, by the RN via the second time zone, the data to the relay node user equipment according to a result of the scheduling on the access link.

4. The method of claim 3, wherein a radio resource zone where the relay node is able to communicate with the base station and a radio resource zone where the relay node is able to communicate with the relay node user equipment overlap with a radio resource zone where the base station is able to communicate with the macro user equipment.

5. The method of claim 3, wherein a radio resource zone where the relay node is able to transmit a signal to the relay node user equipment is identical with a radio resource zone where the base station is able to transmit a signal to the macro user equipment.

* * * * *